United States Patent
Jansen (10) Patent No.: US 11,941,007 B2
(45) Date of Patent: Mar. 26, 2024

(54) METHOD FOR REDUCING THE COMPUTING TIME OF A DATA PROCESSING UNIT

(71) Applicant: ODASS GbR, Hamburg (DE)

(72) Inventor: Daniel Jansen, Friedrichsfehn (DE)

(73) Assignee: ODASS GBR, Hamburg (DE)

( * ) Notice: Subject to any disclaimer, the term of this patent is extended or adjusted under 35 U.S.C. 154(b) by 33 days.

(21) Appl. No.: 16/956,482

(22) PCT Filed: Dec. 19, 2018

(86) PCT No.: PCT/EP2018/085803
§ 371 (c)(1),
(2) Date: Jun. 19, 2020

(87) PCT Pub. No.: WO2019/121890
PCT Pub. Date: Jun. 27, 2019

(65) Prior Publication Data
US 2020/0349167 A1  Nov. 5, 2020

(30) Foreign Application Priority Data

Dec. 22, 2017 (DE) ...................... 10 2017 131 142.4
Oct. 24, 2018 (DE) ...................... 10 2018 126 546.8

(51) Int. Cl.
*G06F 16/2455* (2019.01)
*G06F 16/22* (2019.01)
*G06F 16/28* (2019.01)

(52) U.S. Cl.
CPC .... *G06F 16/24568* (2019.01); *G06F 16/2255* (2019.01); *G06F 16/285* (2019.01)

(58) Field of Classification Search
CPC ............. G06F 16/24568; G06F 16/285; G06F 16/2255
See application file for complete search history.

(56) References Cited

U.S. PATENT DOCUMENTS 4,922,488 A * 5/1990 Niestegge ............. H04L 49/101
370/413
5,506,983 A * 4/1996 Atkinson ............ G06F 16/9017
707/703

(Continued)

OTHER PUBLICATIONS

Wikipedia article "Datenbereinigung", Nov. 14, 2017, 2 pages; https://de.wikipedia.org/w/index.php?title=Datenbereinigung&oldid=170995640 (English article: https://en.wikipedia.org/wiki/Data cleansing) (XP 093076808).

*Primary Examiner* — Allen S Lin
(74) *Attorney, Agent, or Firm* — Muncy, Geissler, Olds & Lowe, P.C.

(57) ABSTRACT

A method for reducing computing time of a data processing unit during processing of data. An input data stream having data stream elements is detected sequentially by at least one data processing unit, at least one element addressable data stream is generated from the input data stream, for each data stream element of the input data stream to be divided up into element components, the element components are grouped into component groups in accordance with different categories, at least individual component groups are checked for coincidence with already detected component groups, at least one element-addressable secondary data stream is generated from the component groups not coinciding with already detected component groups, wherein in the further course, the component group is defined via the address thereof referring to the secondary data stream, an output data stream is generated, and the addresses of the component groups in the secondary data stream is contained in the output data stream, for the sequence of the data stream elements of the output data stream to correspond to the sequence of the data stream elements of the input data stream.

18 Claims, 4 Drawing Sheets

(56) References Cited

U.S. PATENT DOCUMENTS

| | | | | |
|---|---|---|---|---|
| 6,226,715 | B1* | 5/2001 | Van Der Wolf | G06F 12/121 |
| | | | | 711/133 |
| 8,179,792 | B1* | 5/2012 | Doerr | H04L 47/10 |
| | | | | 370/252 |
| 8,429,316 | B1* | 4/2013 | White | G06F 13/4022 |
| | | | | 710/58 |
| 8,874,842 | B1* | 10/2014 | Kimmel | G06F 3/0688 |
| | | | | 711/114 |
| 2002/0099702 | A1* | 7/2002 | Oddo | G06F 16/35 |
| 2004/0193690 | A1* | 9/2004 | Nagai | H04L 63/08 |
| | | | | 709/206 |
| 2005/0159833 | A1* | 7/2005 | Giaimo | G06F 3/165 |
| | | | | 700/94 |
| 2009/0110098 | A1* | 4/2009 | Taylor | H04L 27/2608 |
| | | | | 375/260 |
| 2010/0269147 | A1* | 10/2010 | Zetterower | H04N 21/4325 |
| | | | | 725/114 |
| 2010/0281067 | A1 | 11/2010 | Boldt et al. | |
| 2012/0177347 | A1* | 7/2012 | Date | H04N 5/76 |
| | | | | 386/326 |
| 2016/0103768 | A1* | 4/2016 | Jiang | G06F 12/1027 |
| | | | | 711/159 |
| 2017/0269876 | A1* | 9/2017 | Mukhopadhyay | |
| | | | | G11C 11/5642 |

\* cited by examiner

METHOD FOR REDUCING THE COMPUTING TIME OF A DATA PROCESSING UNIT

BACKGROUND OF THE INVENTION

Field of the Invention

The invention relates to a method for reducing the computing time of a data processing unit during the processing of data, in particular data of a data stream, wherein an input data stream consisting of data stream elements is detected sequentially by at least one data processing unit.

Brief Description of the Related Art

Methods are known for the processing of data on data processing units such as computers or similar computing units for the processing of electronic data, in which data streams composed of data stream elements are detected sequentially by the data processing unit. The data stream elements may be of various lengths. The transmitted data may frequently repeat. Due to the data stream elements being of variable length they can only be processed if the data stream is read completely sequentially by the data processing unit. In particular, in order to analyse individual data stream elements, the analysis must be applied to each read data stream element. This requires a considerable amount of computing time and a large amount of storage space.

SUMMARY OF THE INVENTION

The invention is based on the objective to propose a method for the processing of data of a data stream, which leads to a reduction in computing time of a data processing unit during data processing.

This objective is met by a method with the characteristics of the independent claim(s). Further developments and advantageous designs are described in the sub-claims.

With a method for reducing the computing time of a data processing unit during the processing of data, in particular data of a data stream, wherein an input data stream consisting of data stream elements is detected sequentially by at least one data processing unit, it is provided according to the invention that at least one element-addressable data stream is generated from the input data stream, that each data stream element of the input data stream is divided up into element components, that the element components are grouped into component groups in accordance with different categories, that at least individual component groups are checked for coincidence with already detected component groups, that at least one element-addressable secondary data stream is generated from the component groups not coinciding with already detected component groups, wherein in the further course the component group is defined via the address thereof referring to the secondary data stream, that an output data stream is generated, that the addresses of the component groups in the secondary data stream are contained in the output data stream, that the sequence of the data stream elements of the output data stream corresponds to the sequence of data stream elements of the input data stream. An input data stream such as a sensor data stream or a data stream which contains log files of a web server or similar, is detected sequentially by a data processing unit such as a processor core or similar. The data stream may in this case be composed of data stream elements such as individual log file entries. The data stream elements, i.e. log file entries for example, may in turn contain element components such as a date stamp, a URL address, the name of a requested website or file, an HTTP response code, a transmitted data size, a linking website, descriptions regarding the browser with which the website is visited, and further entries. Due to the variable length of the data stream elements processing of individual data stream elements in the data stream is possible only if the processing is applied sequentially to the incoming data stream elements of the data stream. In order to permit access to individual data stream elements, in other words in order to establish element-addressability of the data stream, at least one element-addressable data stream is generated for the sequentially read input data stream. To begin with each data stream element of the input data stream is divided up into element components. For example log file entries may be divided up as data stream elements into their different element components. The element components can then be grouped into component groups in accordance with different categories. In the example of the log file entries the component groups may for example be a request group, a page group, a time code group, a reference group and other groups. In the request group for example, the name of the host and the browser which is used to access a website may be described. In this case it may be presumed as known for example, that a certain host, i.e. a certain IP address, normally uses the same browser for accessing a website. The element components which are grouped together in a component group may for example comprise a similar change frequency, in particular the same change frequency, i.e. they may change or repeat at the same frequency in the data stream elements. Furthermore it may be possible for a component group to have only a single element component allocated to it so that the component group consists of only one element component. At least one component group/the value of the component group is checked for coincidence with already detected component groups. The value of a component group may for example be the browser name and the IP address. As regards the component groups which do not coincide with already detected component groups, i.e. which for example comprise new content compared to the already detected component groups, these are used to generate an element-addressable secondary data stream for the detected input data stream. Due to the element-addressability of the secondary data stream the position of a component group in the secondary data stream can be calculated. For example data stream elements of the respective secondary data stream may each comprise the same length, or an additional index data stream is generated for the secondary data stream. The data stream elements, i.e. the index data, of the index data stream all comprise the same length, i.e. the same number of element components, and the number of element components output in the data stream prior to the allocated data stream element is contained in an index data. Element addressability of the data stream is made possible via the allocation of the index data stream. The component group is defined via its address pointing to the secondary data stream. An output data stream is generated, in which at least one element address of a component group in the secondary data stream is contained. The sequence of the data stream elements of the output data stream corresponds to the sequence of the data stream elements of the input data stream. Due to an element-addressable data stream being generated for the secondary data stream direct access is possible to individual data stream elements/component groups for further processing, without the necessity of having to sequentially read the entire data stream. This in turn leads to a considerably reduction in computing time of the data processing unit. Moreover this allows a reduction in required storage space by checking the data stream elements for coincidence with already detected component groups, since repeatedly occurring component groups/the values thereof are merely stored.

In a further development of the method the categories consist of different change frequencies and/or repeat frequencies and/or data categories of the element components. The element components can be grouped into different component groups according to different categories, for example according to their change frequencies, i.e. according to their change frequency in the data stream elements of the detected data stream. The change frequency may for example describe the frequency, with which an element component changes in regard to the input data stream elements.

In a further development of the method, with element-addressable data streams an element address is defined by the number of element components output in the data stream prior to the addressed data stream element. An element address, i.e. the address of a data stream element in a data stream, is defined by the number of element components of the detected data stream, which are output prior to the data stream element. Due to the known number of element components output in the detected data stream prior to the data stream element to be retrieved, i.e. prior the addressed data stream element, and their known length, it is possible to directly address the addressed data stream element. Thus sequential reading of the complete data stream for finding the data stream element to be retrieved is not necessary, which leads to a considerable saving in time during retrieval and processing of individual data stream elements.

In a further development of the method an index data stream is allocated to a data stream having at least two data stream elements of different length, a data stream element being considered as a sequence of element components of equal length, the index data of the index data stream being of the same length among each other, wherein the number of element components output in the data stream prior to the allocated data stream element is contained in an index data, wherein the sequence of index data corresponds to the sequence of allocated data stream elements in the data stream, and wherein element addressability of the data stream is ensured via the allocation of the index data stream. Element addressability of a data stream may be ensured due to the fact that all data stream elements of the data stream are of the same length, which means that the data stream elements comprise the same number of element components, wherein the element components among each other are all of the same length. As a result it is possible to calculate the position of a data stream element/a component group in the sequence of data stream elements in the data stream based on a respective multiple of the length of the data stream elements. For example, the position of the nth data stream element in the data stream can be calculated based on n-times the length of a data stream element. Data streams often comprise data stream elements of different length, i.e. different counts of element components. A data stream element may be regarded here as a sequence of element components of equal length. In order to ensure data stream addressability with data stream elements of different length, the data stream is allocated an index data stream. An index data stream is formed by a sequence of index data, the index data among each other being of the same known length. Each data stream element/each component group composed of element components has an index data allocated to it. The index data allocated to a data stream element has stored in it the number of element components, which in the data stream lie before the data stream element allocated to the index data. The sequence of index data corresponds to the sequence of allocated data stream elements in the data stream. Element addressability of the data stream is ensured via the allocation of the index data stream, since the position of an index data in the index data stream, which is allocated to data stream component to be retrieved, can be calculated because the index data among each other is of equal length. The number of element components output in the data stream prior to the allocated data stream element is stored in the index data, so that the position of the data stream element in the data stream to be retrieved is known. In particular an index data stream may be allocated to the secondary data stream of an input data stream. The secondary data stream only contains not yet detected data stream elements. Each data stream element of the secondary data stream has an index data allocated to it. The number of element components, which in the secondary data stream lie upstream of the data stream element of the secondary data stream to be retrieved, is stored in the index data. Due to the fact that the index data stream comprises index data of equal length, the respective position of each index data can be calculated. An output data stream may contain the addresses of the component groups in the secondary data stream due to the fact that the position of the respective index data in the index data stream allocated to the component groups is output. Thus the index data allocated to a component group can be retrieved, wherein the element address of the component group in the secondary data stream is indicated in the retrieved index data.

In a further development of the method the maximum available number of data stream elements of a data stream is dictated by a data interval of the data stream, and addressable data stream elements of a data stream arranged within a data interval refer to data stream elements of the addressable data stream arranged within a data interval. The maximum number of data stream elements of a data stream available at one point in time is dictated by a data interval of the data stream. A data interval thus forms a data window. A data interval may for example be formed by a ring buffer. Data stream elements lying outside the data window/component groups formed from the element components of the data stream elements are recognised as new during the recognition check, i.e. when checking as to whether a component group/the value of the component group is already detected or not. Addressable data stream elements arranged within a data window in a data stream refer to data stream elements of the addressable data stream which are arranged within a data interval. The data stream elements referring to each other are thus spatially close to each other in a storage unit for example, so that a quick reference is ensured from an addressing data stream element to the addressed data stream element. In particular, the data stream elements referring to each other may be recorded in a cache.

In a further development of the method a further data stream is generated for a data stream, the further data stream having the same number and sequence of data stream elements, wherein the further data stream compared to the original data stream comprises changed data stream elements depending on the data stream elements of the original data stream, wherein the data stream elements of the further data stream can be addressed via the same element addresses as the corresponding data stream elements of the original data stream. For example a secondary data stream may be generated, which only contains not yet detected component groups of a data stream. For example the component groups/ the element components can be further dismembered or combined to form new groups. A further data stream for a secondary data stream may be generated, wherein the further data stream comprises the same number and the same sequence of data stream elements. The data stream elements of the further data stream depend on the data stream elements of the secondary data stream, in that the data stream elements of the further data stream are generated from the data stream elements of the secondary data stream through further dismembering or new groupings. The data stream elements of the further data stream can be addressed via the same element addresses as the corresponding data stream elements of the original data stream, since the number and sequence of the data stream elements remain intact.

In a further development of the method the addressing data stream in the original input data stream, through maintaining the sequence of the data stream elements of the input data stream in the output data stream, refers to the associated data stream elements of the output data stream, even for a recursive application of the method. The sequence of the data stream elements of the input data stream is maintained in the output data stream. The addressing data stream in the original input data stream thus refers to the associated data stream elements of the output data stream even for a repeated, i.e. recursively nested application of the method. Repeated application of the method to the secondary data streams is thus possible. In particular, the method may be carried out recursively even at a later point in time or by means of a further data processing unit.

In a further development of the method the data streams are further processed in mutually independent blocks, and further processing is performed separately both spatially and chronologically. Further processing of for example the secondary data streams, in particular a regrouping into further component groups or the further dismembering of element components, may be carried out separately both chronologically and spatially, i.e. for example at a point in time which is later than the first performance of the method and by means of a further data processing unit.

In a further development of the method at least one image, in particular a hash value is allocated to a component group for the purpose of coincidence checking; this hash value is a numerical hash value computed from the component group, identical hash value are computed for identical component groups, a contiguous storage area is reserved as a sequence of storage spaces for storing element addresses, wherein each storage space may contain one element address or is marked as unoccupied, a component group has a storage space allocated to it via the hash value, for a storage space marked as unoccupied the component group is regarded as unrecognised and is output in the associated secondary stream, the storage space is used for storing the address of the component group in the secondary stream, and this address, as a result of the check of the component group, then continues to be used. One option of performing a coincidence check of component groups/the values of component groups consists in allocating an image, in particular a numerical hash value, to a component group/a value of a component group. Identical hash values are calculated for identical component groups, i.e. for component groups with identical values. In particular it may be the case that there is an unequivocal allocation of the value of a component group to a hash value. A component group/the value of a component group, in particular the element address of a component group, is allocated a storage space in a storage area by way of the hash value, in particular in dependence of the hash value. The storage spaces of the storage area are in this case marked either as occupied by an element address or as unoccupied, i.e. free. For a free storage space allocated to the component group the component group/the value of the component group is regarded as not yet detected and thus as new or unrecognised and output in the allocated secondary data stream. The free storage space is used to store the element address of the component group in the secondary data stream, i.e. the addressing element address in the secondary data stream. This stored address is used for coincidence checking of further component groups/the values of the component groups through reference to the component group in secondary data stream.

In a further development of the method, for a storage space marked as occupied, the component group from the secondary stream, which is addressed by the element address indicated in the storage space, is checked for coincidence with the component group to be stored, and in case of a match the address indicated in the storage space is output in the output stream.

In a further development of the invention if there is no match between the component group and the component group addressed by the occupied storage space, an alternative storage space is allocated via the hash value to the component group to be stored, a further coincidence check is performed for this alternative storage space, and in case of non-coincidences further alternative storage spaces are allocated. In case of non-coincidence of the component group/ the value of the component group, which is allocated to the element address in the storage space, with the detected component group/the value of the detected component group, a further storage space is allocated to the component group to be stored via the hash value. Another coincidence check is then performed for this further storage space. In case of a match between the component group to be stored/ its values and the component group/its value addressed by the address stored in the further storage space the element address stored in the storage space is output into the output data stream. In case of no match a further storage space can be chosen via the hash value. The number of cycles, i.e. the number of alternatively allocated storage spaces can be determined by settings. For example in case of no match between the component group to be stored and the third component group addressed in the third allocated storage space, the element address stored in the third storage space may be replaced by the element address of the component group to be stored.

In a further development of the invention, in case of no match between the component group and the component group addressed by the occupied storage space, the address of the component group is stored in the secondary stream in the storage space, wherein the original content of the storage space is replaced. In case of no match between the component group to be stored and the component group addressed by the element address in the allocated storage space, the element address stored in the allocated storage space may be replaced by the element address of the component group to be stored. In this way element addresses referring to older data are replaced by element addresses referring to previously output data by the data stream, since it may be assumed, as the case may be, that this data is no longer needed for current processing.

In a further development of the invention, in case of recurring occupancy of the storage spaces, the storage space with the smallest element address is defined as unoccupied, and for an address outside the available secondary stream interval and situated within the storage space, the storage space is defined as free. If for example for a repeated performance of the method the storage spaces allocated to the component group are found to be occupied, i.e. if for example a component group is allocated the same storage spaces in consecutive cycles, the storage space with the smallest element address may be defined as unoccupied. The smallest element address of an addressed component group points to the fact that the component group was output into the data stream prior to the component groups addressed in the further storages spaces, which means that the data of the component group is older. The element address of the older component group can thus be overwritten with the element address of the component group, which is to be stored now.

Coincidence checking is carried out using multi-stage coincidence checking, wherein the value of a data stream element is initially processed in a global area allocated to at least one group of component groups and as a result is converted into an address in the secondary stream, this address is allocated, in a second stage, to an area and a secondary stream in at least one sub-group of the group of component groups, this secondary stream then contains these addresses instead of direct component group values and is thus regarded as an index in the main secondary stream, and this additional secondary stream therefore contains only addresses, which have occurred in this sub-group.

In a further development of the method multi-stage coincidence checking is used, wherein in a first stage the value of a data stream element is detected, wherein the value of the data stream element consists of element components, the value of the data stream element consisting of element components is allocated an address in a first secondary data stream, and in a second stage this address is allocated at least one group of addresses of element components in a further secondary data stream, wherein this further secondary data stream contains addresses of the element components and therefore functions as index in the first data stream. The data stream elements may for example be log files of a server, into which for example values such as a time stamp, the name of a client used, the browser used and the website retrieved as well as a time stamp are entered. The element components of the data stream element are given here as a result of the client used, the browser used and the website retrieved. A time stamp for example may be separated from the other element components and may be processed separately. There are several possible combinations of client, browser and retrieved website. Each combination is allocated an address in a secondary data stream. A data stream element, here a log file, can be allocated an address in a secondary data stream, so that the combination of element components contained in the data stream is addressed via an index.

A checking stage is formed and allocated, not by using a group type, but by using a value or an address within a group, in this stage values of a second component group are checked for coincidence and in addition only element addresses are output in the allocated secondary stream, which correspond to a combination of the value of the stage and the value of the component group.

In a further development of the method a data stream comprising data stream elements is detected, wherein the data stream elements are composed of element components different from one another, the element components of all data stream elements may be sorted into categories, the element components of further categories, which occur in a data stream element together with an element component of a first category, are checked for coincidence, and the element components occurring in further data stream elements together with element components of the first category are output in a secondary data stream.

For example a data stream may be composed of data stream elements, wherein the data stream elements may for example be log files of a server. The data stream elements, i.e. for example the log files, may consist of element components of different categories. For example, the name of the client used may indicate a first category, the browser name or the called-up website may each indicate a further category. Each client value, for example client A, client B, may now for example be allocated an element-addressable secondary data stream, which may for example contain the browsers used by each client type/the websites called up by each client type. This means that very quick access is possible to information, for example which websites were called up by a client type or which browsers were used by a client type.

The current value or the address of a second component group is allocated to each different value from the one component group, and this is stored in a storage area sorted by value or address of the first group, this storage area is regarded as an element of a new input data stream of a further stage according to the method, in here a coincidence check group-wise applied according to settings is again performed, and in addition a recognition of patterns and value sequences is carried out in groups as an output stream result.

In a further development of the method a data stream element consists of element components, the element components of a data stream element can be sorted into at least two categories, each element component of a first category is allocated at least one element component of a second category, the allocation of the element components of a data stream element is checked for coincidence with the allocation of the element components of the further data stream elements and an address in a secondary data stream is allocated to the allocation of the element components. The element components of a data stream element are for example sorted into two categories. The element components of the first categories may for example be the names of different electrical consumers, whilst the element components of the second category consist of the statuses of the consumers, for example whether the consumers are switched on or switched off. The current status of all consumers, i.e. the allocation of the element components of the first category to the element components of the second category may be allocated an address in a secondary data stream. Thus recurring statuses, for example when consumers A and B are switched on and consumers C and D are switched off, can be recognised in an effective computing-time-manner and transmitted with low data transmission.

In a further development of the method, method steps are applied within a stage or in cascading stages, thereby separated both spatially and in terms of time.

The inventive method will now be explained further by way of an exemplary embodiment:

Example: Apache Webserver Access Log File

For information: the log file discussed here is generated completely at random.

The following symbols are used hereunder:

xyz—identifier (e.g. partial element name, group, . . . )
. . . —synonym for random content
|xyz|—partial element
@xyz@—group/partial group
[ . . . ]—denotes an array or grouped data
{ . . . }—denotes a recognition stage/map
~ . . . ~—denotes a stream xyz[ . . . ]—form for named structure, here: an array xyz with elements . . .
xyz[a,b,c]—specialised form, here: an array xyz with elements a, b and c
xyz{ }—recognition stage/map
~xyz~—stream/partial stream/secondary stream/output stream
abc>~xyz~—address of an element abc in stream xyz
The format of these log files is normally as follows:
Example:
192.168.178.13 - -[02/Jun/2015:22:49:39+0100]"img/nord.png" 200 1928384 "www.blog_ueber_dinge.de/wir/im/urlaub/2014/April/links" "Mozilla/5.0 (Linux; Android 4.4.2; A3-A20 Build/KOT49H) AppleWebKit/537.36 (KHTML, like Gecko) Chrome/57.0.2987.132 Safari/537.36" "-"
192.168.178.13 - -[02/Jun/2015:22:52:35+0100]"img/whg1.png" 200 283212 "img/nord.png" "Mozilla/5.0 (Linux; Android 4.4.2; A3-A20 Build/KOT49H) AppleWebKit/537.36 (KHTML, like Gecko) Chrome/57.0.2987.132 Safari/537.36" "-"
192.168.178.192 - -[02/Jun/2015:23:01:06+0100] "img/whg2.png" 200 483722 "www.reisebuero.net?kunde=12382ajablkdsu12" "Mozilla/5.0 (Linux; Android 4.4.2; de-at; SAMSUNG GT-I9301I Build/KOT49H) AppleWebKit/537.36 (KHTML, like Gecko) Version/1.5 Chrome/28.0.1500.94 Mobile Safari/537.36" "-"
192.168.178.192 - -[02/Jun/2015:23:06:52+0100]"photos/0001.png" 200-1 "img/whg2.png" "Mozilla/5.0 (Linux; Android 4.4.2; de-at; SAMSUNG GT-I9301I Build/KOT49H) AppleWebKit/537.36 (KHTML, like Gecko) Version/1.5 Chrome/28.0.1500.94 Mobile Safari/537.36" "-"

When abstracted each line (separated by "\n") contains the following parts/sub-elements:
|host| - - [|timestamp|] "|request|" |code| |size| "|referer|" "|agent|" "|aux|"|
Definition:
|host|: the URL/address of the caller
[|timestamp|]: time stamp (format: day/month/year:hour:minute:second deviation from Greenwich time) request result code file size name of browser
|request|: the requested website/file
|code|: the HTTP response code, e.g. 200 for OK
|size|: transmitted file size
|referer|: linking page previously viewed by the visitor
|agent|: description of browser/tools with which the website was visited
|aux|: ?
Based on this observation and the logical analysis the following breakdown/grouping was ascertained:
Group @req@: |host|+|agent| (it is to be assumed that requests from $host in large parts are carried out using the same browser $agent=> similar change frequency)
Group @pag@: |request|+ |code|+ |size| (assumption: identical file requests are normally responded to with identical response $code and identical file size $size)
Group @utc@: |timestamp| (not really a group; timestamp is not subjected to any recognition and treated separately, repetition is not to be expected)
Group @ref@: the linking page
Group @aux@: |aux| is ignored in this discussion (field is always empty in this example)
On this basis respective data structures are then generated/storage areas are provided:

{RAW}: first recognition stage, here all relevant groups (@req@, @paq@, @ref@) are initially processed
in this stage actual recognition of the group values takes place, values become addresses in the secondary stream ~RAW~
the data structure created is an area consisting of 1000 storages spaces (slots) for addresses in the secondary stream
in addition a ring buffer with 1 MB data volume is reserved for the values secondary stream (the 1 MB last values contain the values for the coincidence check)
in addition a ring buffer with 1000 elements is reserved for the index secondary stream (contains the last 1000 offsets for the values secondary stream for the coincidence check; the values are of variable length; the index secondary stream serves to establish element addressability)
{Req}: downstream recognition stage for forming a list of visitors
here the previously ascertained addresses are processed again and converted into addresses allocated to this group in the (address) secondary stream ~Req~
a data structure is created which is an area consisting of 100 storage spaces (slots) for two addresses respectively
{Pag}: downstream recognition stage for forming a list of visited pages
here the previously ascertained addresses are processed again and converted into the address allocated to this group in the (address) secondary stream ~Pag~
a data structure is created which is an area consisting of 100 storage spaces (slots) for two addresses respectively
{Ref}: downstream recognition stage for forming a list of visited pages
here the previously ascertained addresses are processed again and converted into the address allocated to this group in the (address) secondary stream ~Ref~
a data structure is created which is an area consisting of 100 storage spaces (slots) for two addresses respectively
the created data structures are pre-allocated a value (hex 0xFFFFFFFF), which denotes an "empty" slot
since presumably values in the "group" @utc@ will constantly change, these are not subjected to any recognition; instead they are converted into a Unix time stamp,
which can be stored as a 32 bit unsigned integer (4 bytes), and since 1 Jan. 1970 is indicated in seconds.
Besides changeability into a 4 byte value is, in view of data reduction, equivalent to recognition and change into an address (here also 32 bit)
All ascertained group addresses including the changed time stamp are then combined to form an output element and appended to the output stream.
After processing the following structure results:
RAW~firstReq,firstPag,firstRef,secondReq, secondPag . . . ~
Req~firstReq>RAW,secondReq>RAW . . . ~
Pag~firstPag>RAW,secondReq>RAW . . . ~
Ref~firstRef>RAW,secondRef>RAW . . . ~
output ~[timestamp, first>Ref, first>Pag, first>Ref], [timestamp, second>Req, second>Pag, second>Ref] . . . ~

After defining/generating the necessary data structures the log file is then processed element to element as an input stream.

Input Element:
192.168.178.13 - -[02/Jun/2015:22:49:39+0100]"img/nord.png" 200 1928384 "www.blog_ueber_dinge.de/wir/im/urlaub/2014/April/links" "Mozilla/5.0 (Linux; Android 4.4.2; A3-A20 Build/KOT49H) AppleWebKit/537.36 (KHTML, like Gecko) Chrome/57.0.2987.132 Safari/537.36" "-"

Breakdown into Sub-Elements:
|host|: 192.168.178.13
|utc|: 02/Jun/2015:22:49:39+0100
|request|: img/nord.png
|code|: 200
|size|: 1928384
|referer|
  : www.blog_ueber_dinge.de/wir/im/urlaub/2014/April/links
|agent|: Mozilla/5.0 (Linux; Android 4.4.2; A3-A20 Build/KOT49H) AppleWebKit/537.36 (KHTML, like Gecko) Chrome/57.0.2987.132 Safari/537.36
|aux|: -

Grouping:
@utc@: 02/Jun/2015:22:49:39+0100 // |utc|; corresponding to 1433281807 (seconds since 1 Jan. 1970)
@req@:[192.168.178.13, Mozilla/5.0 (Linux; Android 4.4.2; A3-A20 Build/KOT49H) AppleWebKit/537.36 (KHTML, like Gecko) Chrome/57.0.2987.132 Safari/537.36]// |host|, |agent|
@pag@:[ img/nord.png,200,1928384]// "|request|, |code|, |size|
@ref@
  : www.blog_ueber_dinge.de/wir/im/urlaub/2014/April/links // |referer|

Recognition in the First Stage (Stage {RAW}):
1) Generating a hash value for @req@: h=hash(" [192.168.178.13, Mozilla/5.0 (Linux; Android . . . ]")=2003304065
2) Selecting a slot via h: h modulo 1000=65=slotA // the data structure we have chosen is an array with 1000 slots
3) Checking the slot:
   If marked as "empty" (0xFFFFFFFF) or address outside the index ring buffer area or index value (offset) outside the value ring buffer area:
      value of @req@ is output into the ~RAW~ value secondary stream via appending to the value ring buffer
      (Byte) address in the value secondary stream (ring buffer) is output into the index secondary stream (index ring buffer)
      Note down address (=number of elements in the index stream) in the ascertained slot and also return as a result
   otherwise (valid address exists), use it to ascertain linked value and compare to current value of @req@
      if values match:
         return slot content (=address)
      if values don't match:
         discard slot content
         output value of @req@ into the ~RAW~ value secondary stream via appending to the value ring buffer
         output (byte) address in the value secondary stream (ring buffer) into the index secondary stream (index ring buffer)
         note down address (=number of element in index stream) in the ascertained slot and also return as a result
   since the first value is considered here, the result is address 0

Recognition in the Second Stage (Here {Req}):
1) Select a slot via the previously ascertained address req>RAW (=0): req>RAW modulo 100=0=// we have chosen here a structure with 100 elements
2) Check the slot (space 1 of the slot, 2 spaces per slot):
   If empty (0xFFFFFFFF):
      Output req>RAW in ~Req~ secondary stream
      Note down req>RAW in the first space of slot (2 spaces per slot)
      Note down address (=number in secondary stream) in the second space of slot and return as result
   If equal:
      Output address in the second space of the slot as result
   If unequal:
      Output req>RAW in the ~Req~ secondary stream
      Note down req>RAW in first space of the slot (1 spaces per slot)
      Note down address (=number in secondary stream) in the second space and return as result
   Proceed analogously for the further groups @pag@ and @ref@.
   three addresses and a time stamp now exist as a result, each as unsigned integer 32 bit (4 bytes).
   These are then appended as a group [timestamp, first>Req, first>Pag, first>Ref] to the output stream.

The method then starts again from the beginning for the next element in the input stream.

BRIEF DESCRIPTION OF THE DRAWINGS

The invention will now be explained in further detail by way of an exemplary embodiment depicted in the drawing, in which FIG. 1 schematically shows the allocation of an index data stream to a data stream.

DETAILED DESCRIPTION OF THE PREFERRED EMBODIMENTS

Figure 1:
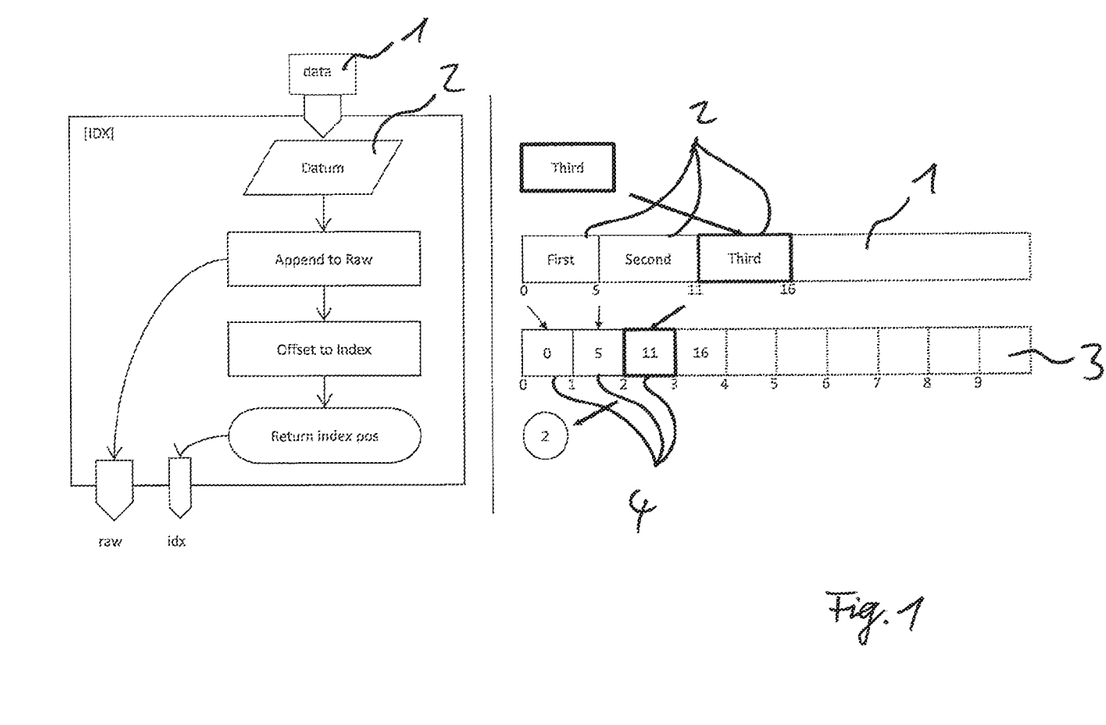

In FIG. 1 it is schematically depicted by way of an exemplary embodiment, how an index data stream 3 can be allocated to a data stream 1, which comprises at least two data stream elements 2 of variable length. In general, a single data, i.e. a data stream element 2 of a data stream, has a variable length. This may be for example the file paths or in the further course also the file content, within data streams, here a list of file paths. In this example the data stream elements are words, which may be of different lengths, i.e. may contain different numbers of letters. For targeted access the entire data stream 1 must be read sequentially, in order to determine start, length/end of the data. In order to permit index-based access, an additional element-addressable index data stream 3 is generated during data detection, for example during reading of the file. The index data stream 3 may contain offsets of individual data of the actual data stream 1. This new index data stream 3 consists of nothing but entries, i.e. index data 4 of equal length, e.g. 32 bit integer. The position of the nth entry can thus be ascertained via a simple calculation, in this case n*4 bytes, which then refers to the start of associated data in the data stream. This index 4 in the new data stream 1 can then be understood additionally for identification as the ID of the data, wherein so far there has been no recognition of identical data components.

The actual data stream 1 can then be processed further. For example, when the index data stream 3 is replaced against an appropriately adapted further processed data stream 3, the same index 4 always refers to the same but now further processed dataset, for example now to the file content instead of the file path. In addition the new ID, because of its sequential character—for example this may be a consecutive number—can be used as a basic structure and basic concept for reference purposes, also directly for synchronising or for "lazy loading/processing" concepts. In other words, when querying a certain index/a certain ID it can be checked via e.g. paging structures (similar to the virtual memory concepts), as to whether (further processed) data is already available and is therefore only loaded/further processed on demand.

Figure 2:
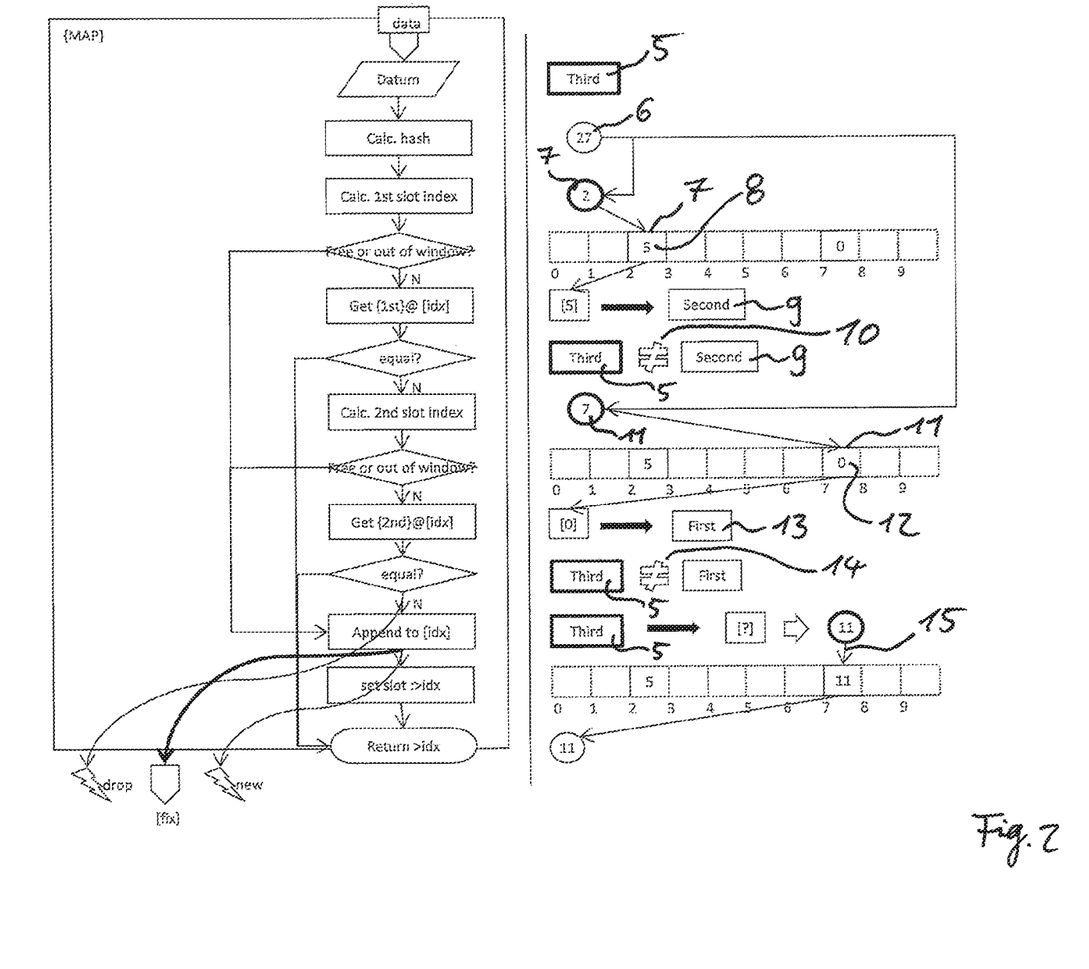
FIG. 2 schematically shows coincidence checking of individual component groups by means of allocating a hash value.

FIG. 2 schematically shows coincidence checking of individual component groups 5, individual words in this example, by means of allocating a hash value 6. In the following the background of identical data/file contents can be recognised as far as possible. To this end the fundamentally changeable element components such as the file path, the time stamp or the like are in this discussion separated from the repeating element components 5, such as the actual file contents or words in this example, wherein the focus is initially directed at the repeating element components 5.

The basis of the method is an arrangement, a so-called array from above-defined index entries. This arrangement is called a MAP. This MAP is connected to the above-defined combination of data streams and indexed secondary streams.

For each incoming dataset or, as described above, for the previously extracted element components 5/the component group 5, here for each word, a hash value 6 is calculated by means of standard procedures such as xxhash. This is then used for selecting a storage space 7, a so-called slot in the MAP. For example the slot number may be calculated as follows: slot no=hash modulo map size. If this slot is still unoccupied/the index or component group of the secondary stream referenced thereby lies outside a previously defined data interval, the data is then attached as a new entry in the OFF/DAT streams, i.e. the index data stream/secondary data streams. The associated index, i.e. the element address, is stored in the allocated slot and this index is attached to the MAP output stream. The file interval may be a sliding data window of available entries in the OFF/DAT stream, measured from the last current entry e.g. 1000 entries in the cache/e.g. 1 GB of data in the cache.

If the slot is not empty, the content 9 referenced via the index 8 is initially compared to the current content. In case of disparity 10 a new slot 11 may, as required, be chosen from the hash value 6, for example by recombining the used bytes or by a different breakdown or similar, and thereafter the process is continued with this new slot 11. This is continuously repeated, until a free or old slot has been found or if any further repetition is regarded as no longer meaningful. This may include weighing non-recognition against time-spent-on-repetition. For example, if the component group 5 is allocated repeatedly to occupied slots 7, 11, an occupied slot 11 can be overwritten with the component group 5 to be stored. In particular the component group 5 to be stored can be compared to the content 13 referenced via the index 12 contained in the repeatedly allocated slot 11. In case of lack of coincidence 14 the slot 11 can be overwritten 15 with the component group 5 to be stored. In case of parity the index is returned in the MAP output stream. The size of the cache window, of the MAP, the number of repetitions and the quality of the hash process are setting options for as optimal as possible a recognition of identical data. It is thus possible to apply the method to random data quantities with limited resources such as limited storage space and to permit close to 100% recognition by means of multiple process handling procedures. "Collisions" via the hash values, depending on the size of the MAP are to be regarded as relatively seldom.

Figure 3:
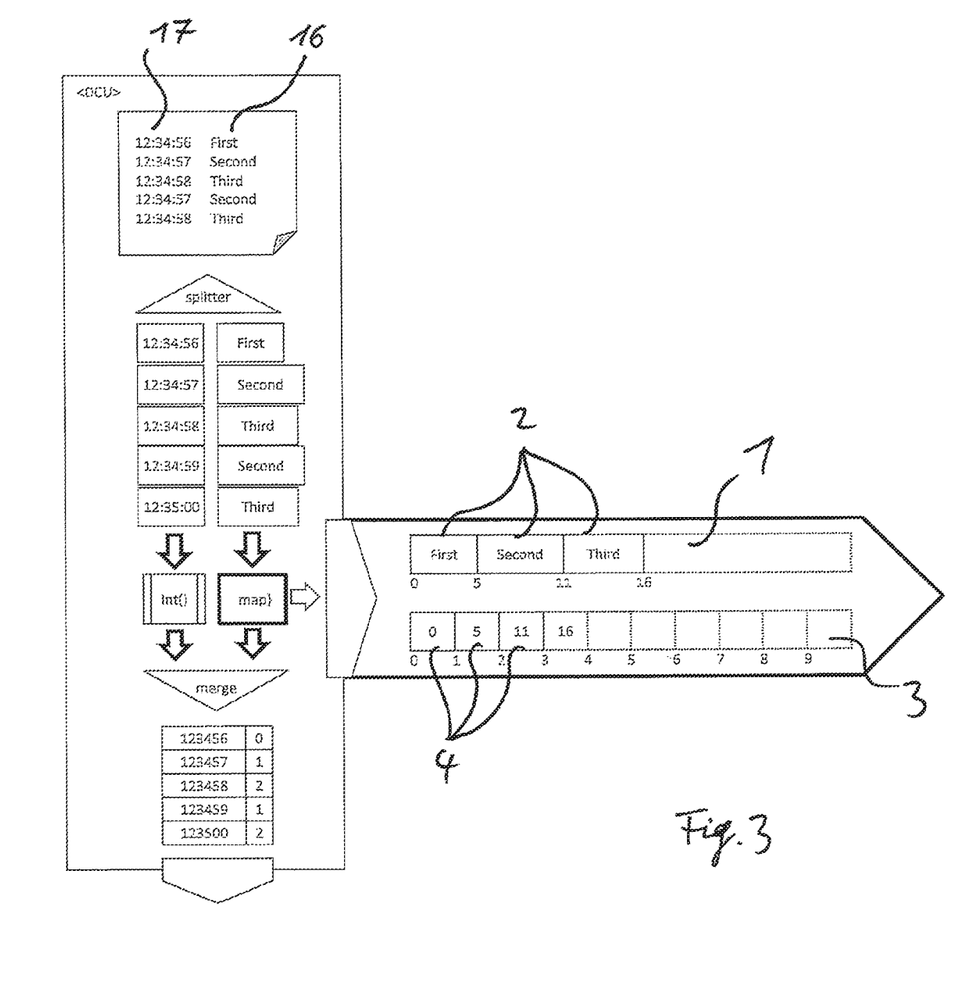
FIG. 3 schematically shows the separate processing of component groups.

FIG. 3 schematically shows how component groups can be processed separately from each other. As already described, potentially repeating element components 16, i.e. individual words in this depiction such as file contents are separated from potentially unique non-repeating element components 17 such as file paths, here time stamps or similar. This separation is carried out in a superior method step. Individual parts are then, as required, fed to internal processing streams as per FIG. 2/re-used and attached in the result (-stream) 25 by reference relative to the other partial results.

Figure 4:
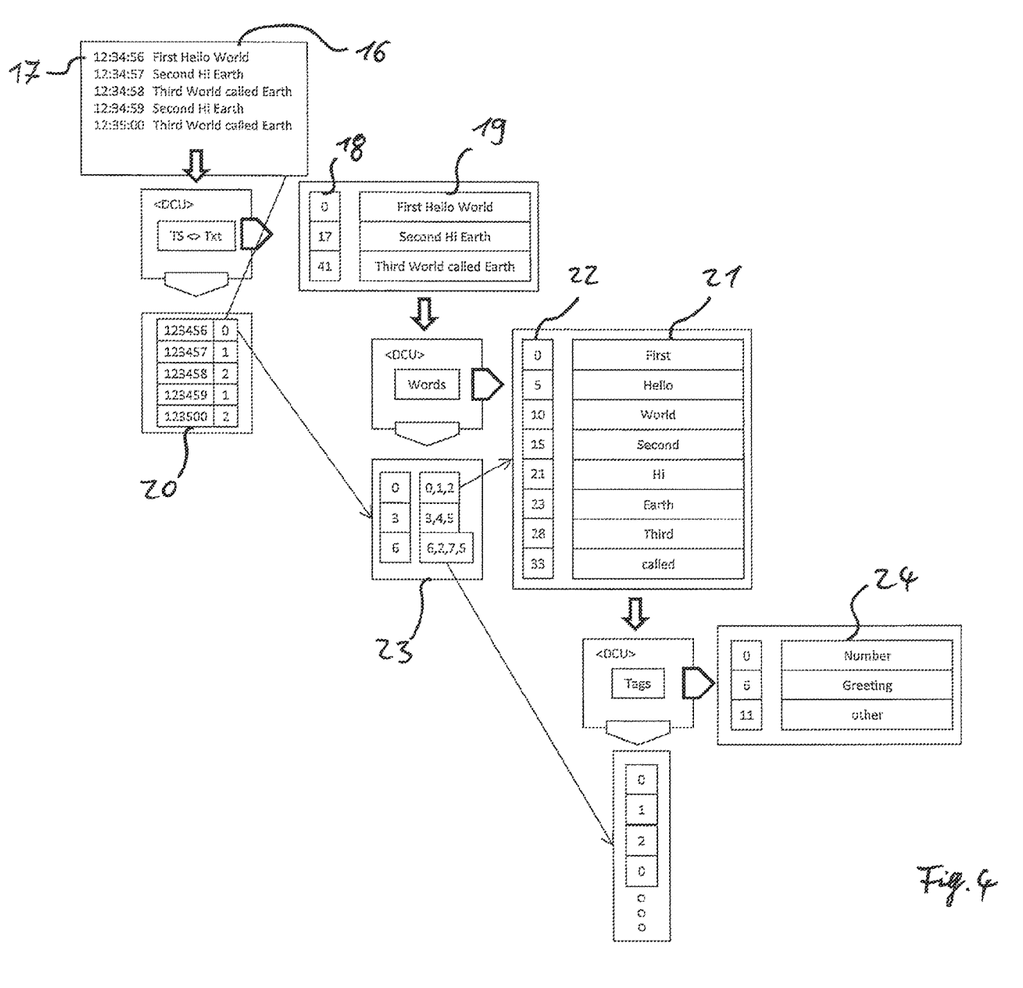
FIG. 4 schematically shows how secondary data streams are exchanged against further data streams.

FIG. 4 schematically shows how secondary data streams are replaced by further data streams. For example after carrying out the procedure for the first time, the data can be processed further. By exchanging the OFF data streams the data entries referenced by indices/element addresses may each refer to additional or adapted data. It would be feasible to provide the files, for example via further analyses such as an image recognition or similar, with key words such as resolution in case of photos, motive, contained locations. Analysis is then required only once, since in case of repetition analysis results can be directly re-used. In the example file paths may be marked for identical contents by means of links to the file first recognised, the content as such therefore needs to be stored only once. For example repeating element components 16 such as file contents, or in this example sentences consisting of words, may be separated from non-repeating element components 17, such as time stamps. An index data stream 18, which refers to the secondary data stream 19, can be generated for the data stream 16 with the repeating element components. An output data stream 20 may be output, which refers to the secondary data stream 19. The secondary data stream 19 can be broken down further into repeating element components, here individual words occurring in the sentences, which can be combined in a further secondary data stream 21. A further index data stream 22 can refer to the secondary data stream 21. A further output data stream 23 can be generated for this, which refers to the secondary data stream 21. Thus the output data stream 23, the secondary data stream 21 and the index data stream 22 replace the secondary data stream 19 by the index data stream 18. Similarly the element components can be sorted into categories 24, as a result of which the secondary data stream 21 is extended.

All features mentioned in the above description and in the claims can be randomly selectively combined with the features of the independent claim. Disclosure of the invention is not limited to the described/claimed feature combinations, rather all feature combinations, which are meaningful in terms of the invention, are to be regarded as disclosed.

The invention claimed is:

1. A method for reducing the computing time of a data processing unit during processing of data,
wherein
an input data stream consisting of data stream elements is read and detected sequentially by at least one data processing unit,
each data stream element of the input data stream is divided up into element components,
the element components are grouped into component groups in accordance with different categories,
at least individual component groups are checked for coincidence to determine whether the component groups have already been detected, wherein component groups which do not coincide with the already detected component groups comprise new content to the already detected component groups,
at least one element-addressable secondary data stream is generated, by the data processing unit, from the component groups not coinciding with already detected component groups,
wherein the element-addressable secondary data stream contains only the component groups not coincide with the already detected component groups in the element-addressable secondary data stream,
wherein the element addressability of the secondary data stream is established by the assignment of an index data stream to the secondary data stream,
wherein an address of each component group of the secondary data stream is stored in the index data stream,
wherein the index data stream includes slots each containing index data and corresponding element components, the index data each indicating an address of one of the component groups in the element-addressable secondary data stream,
wherein the index data being of the same length among each other, wherein the length is the number of element components of an index datum, thus that a position in the index data stream is calculable due to the same length of the index data by multiplying this length of the index data with the position of the index datum to be calculated, wherein a position of an n-th index datum can be calculated by multiplying n with the length of the index data,
wherein a position of a secondary data stream element in the secondary data stream can be determined, thereby that the number of element components of the secondary data stream components located in the secondary data stream prior to the secondary data stream element to be determined is contained in the index datum assigned to the secondary data stream element,
wherein an order of index data corresponds to an order of allocated assigned data stream elements in the secondary data stream,
an output data stream is generated by inputting the slots in the element-addressable secondary data stream,
wherein the output data stream contains the element components in the input data stream and slot positions of the index data stream, each slot position containing the address of the corresponding element component in the secondary data stream,
wherein a sequence of the address of the data stream elements of the output data stream corresponds to the sequence of data stream elements of the input data stream,
wherein the input data stream is completely restorable from the output data stream with the same sequence of data elements via the element addresses of the secondary data stream included in the index data stream, and the output data stream is fed to a further processing in the data processing unit.

2. The method according to claim 1, wherein the categories are different change frequencies and/or repeating frequencies and/or data categories of the element components.

3. The method according to claim 1, wherein the element-addressable data streams an element address is defined by the number of data stream elements which are output in the data stream prior to the addressed data stream element.

4. The method according to claim 1, wherein element addressing of the data stream is ensured via the allocation of the index data stream.

5. The method according to claim 1, wherein the maximum available number of data stream elements of the input data stream is predefined by a data interval of the data stream, that addressable data stream elements of a data stream arranged within the data interval refer to data stream elements of the addressed data stream arranged within the data interval.

6. The method according to claim 1, wherein a further data stream with the same number and order of data stream elements is generated for the secondary data stream, wherein the further data stream, compared to an original secondary data stream, comprises changed data stream elements depending on the data stream elements of the original secondary data stream, wherein the data stream elements of the further data stream are addressable via the same element addresses as the corresponding data stream elements of the original secondary data stream.

7. The method according to claim 1, wherein, due to maintaining the sequence of data stream elements of the input data stream in the output stream, an addressing data stream in the original input data stream refers to the associated data stream elements of the output data stream even for a recursive application of the method.

8. The method according to claim 1, wherein the secondary data streams are further processed in mutually independent blocks and in that further processing is carried out separately both in terms of space as well as time.

9. The method according to claim 1, wherein in order to carry out a coincidence check at least one component group is allocated at least one image, in particular a hash value, that this hash value is a numerical hash value calculated from the component group, that identical hash values are calculated for identical component groups, that a contiguous storage area is reserved as a sequence of storage spaces for storing element addresses, wherein each storage space may contain one element address or is marked as unoccupied, that a storage space is allocated to a component group via the hash value, that for a storage space marked as unoccupied the component group is regarded as unrecognized and output in the allocated secondary data stream, that the address of the component group in the secondary data stream is stored in the storage space, that this address is used further as the result of the check on the component group.

10. The method according to claim 9, wherein the storage space allocated to a component group marked as occupied the component group from the secondary data stream, which is addressed by the address given in the storage space, is checked for coincidence against the component group to be stored and wherein in case of coincidence the address given in the storage space is output in the output data stream.

11. The method according to claim 9, wherein the case of non-coincidence of the component group to be checked against the component group addressed by an occupied storage space, an alternative storage space is allocated by the hash value to the component group to be stored, that a further coincidence check is carried for this alternative storage space and that in case of further non-coincidences further alternative storage spaces are allocated.

12. The method according to claim 9, wherein the case of non-coincidence between the component group to be checked and the component group addressed by an occupied storage space the address of the component group in the secondary stream is stored in the storage space, wherein the original content of the storage space is replaced.

13. The method according to claim 9, wherein for a recurring occupancy of the storage spaces, the storage space with the smallest address is defined as not occupied, and for an address outside the available secondary data stream interval and contained in the storage space, the storage space is defined as unoccupied.

14. The method according to claim 1, wherein a multi-stage coincidence check is used for coincidence checking, wherein in a first stage the value of a data stream element is detected, wherein the value of the data stream element consists of element components, that the value of the data stream element consisting of element components is allocated an address in a first secondary data stream and that in a second stage this address is allocated at least one group of the addresses of element components in a further secondary data stream, wherein this further secondary data stream contains addresses of the element components and thus functions as an index in the first data stream.

15. The method according to claim 1, wherein a data stream comprising data stream elements is detected, wherein the data stream elements are composed of element components different from each other, that the element components of all data stream elements may be sorted into categories, that the element components of further categories occurring in a data stream element together with an element component of a first category are checked for coincidence and that the element components occurring in further data stream elements together with the element components of the first category are output in a secondary data stream.

16. The method according to claim 1, wherein a data stream element consists of element components, that the element components of a data stream element can be sorted into at least two categories, that each element component of a first category is allocated at least one element component of a second category, that allocation of the element components of a data stream element is checked for coincidence with the allocation of the element components of the further data stream elements and that the allocation of the element components is allocated an address in a secondary data stream.

17. The method according to claim 1, wherein method steps are applied within a stage or in cascading stages, and thus separated both in terms of time and in terms of space.

18. A method for reducing the computing time of a data processing unit during the processing of data, in particular data of a data stream,
wherein
an input data stream consisting of data stream elements is detected sequentially by at least one data processing unit,
each data stream element of the input data stream is divided up into element components,
the element components are grouped into component groups in accordance with different categories,
at least individual component groups are checked for coincidence to determine whether the component groups have already been detected, wherein component groups which do not coincide with already detected component groups comprise new content to the already detected component groups,
at least one element-addressable secondary data stream is generated, by the data processing unit, from the component groups not coinciding with already detected component groups,
wherein the element-addressable secondary data stream contains only the component groups not coincide with the already detected component groups in the element-addressable secondary data stream,
wherein the element addressability of the secondary data stream is established by the assignment of an index data stream to the secondary data stream,
wherein an address of each component group of the secondary data stream is stored in the index data stream,
wherein the index data stream includes slots each containing index data and corresponding element components, the index data each indicating an address of one of the component groups in the element-addressable secondary data stream,
wherein the index data being of the same length among each other, wherein the length is the number of element components of an index datum, thus that a position in the index data stream is calculable due to the same length of the index data by multiplying this length of the index data with the position of the index datum to be calculated, wherein a position of an n-th index datum can be calculated by multiplying n with the length of the index data,
wherein a position of a secondary data stream element in the secondary data stream can be determined, thereby that the number of element components of the secondary data stream components located in the secondary data stream prior to the secondary data stream element to be determined is contained in the index datum assigned to the secondary data stream element,
wherein an order of index data corresponds to an order of allocated data stream elements in the secondary data stream,
an output data stream is generated by inputting the slots in the element-addressable secondary data stream,
wherein the output data stream contains the element components in the input data stream and slot positions of the index data stream, each slot position containing the address of the corresponding element component in the secondary data stream,
a sequence of the address of the data stream elements of the output data stream corresponds to the sequence of data stream elements of the input data stream,
a component group which is recognized as coincident with an already detected component group is not stored once again,
wherein the input data stream is completely restorable from the output data stream with the same sequence of data elements via the element addresses of the secondary data stream included in the index data stream, and
wherein no data of the input data stream is lost, due to storage of each component group which does not coincide with already detected component groups.

* * * * *